United States Patent [19]

Strott

[11] 3,796,445
[45] Mar. 12, 1974

[54] PIPE SADDLE

[75] Inventor: Fred R. Strott, Arvada, Colo.

[73] Assignee: Rimrock Enterprises Inc., Colorado City, Colo.

[22] Filed: Dec. 29, 1971

[21] Appl. No.: 213,394

[52] U.S. Cl............ 285/4, 285/197, 285/297, 285/423, 285/DIG. 16
[51] Int. Cl............................................. F16l 5/00
[58] Field of Search....... 285/4, 158, 189, 197, 198, 285/199, 201, 231, 297, DIG. 16, 3, 423

[56] References Cited
UNITED STATES PATENTS

| 1,908,821 | 5/1933 | Cornell | 285/197 |
|---|---|---|---|
| 1,352,248 | 9/1920 | Coar | 285/4 |
| 444,235 | 1/1891 | McHugh | 285/197 |
| 2,680,631 | 6/1954 | Smith | 285/197 X |
| 3,218,093 | 11/1965 | Carlson | 285/197 |
| 3,561,796 | 2/1971 | Williams | 285/199 X |
| 3,649,055 | 3/1972 | Nilsen | 285/197 |

FOREIGN PATENTS OR APPLICATIONS

| 581,440 | 8/1959 | Canada | 285/199 |
|---|---|---|---|
| 1,486,484 | 5/1967 | France | 285/197 |
| 843,296 | 6/1970 | Canada | 285/197 |

Primary Examiner—Mervin Stein
Assistant Examiner—David H. Corbin
Attorney, Agent, or Firm—C. B. Messenger

[57] ABSTRACT

A saddle component for use when making connections at intermediate points on installed or uninterrupted main lines. The saddle provides an inner stub for extension through a cut hole in the main line and a flange receptacle thereabove for reception of a branch line pipe. A downwardly extending skirt provides with said stub a recess for seal materials. The skirt is marked to facilitate fabrication of efficient transition shapes adapting the saddle for use on various size main lines. A diaphragm section separates the flange from said stub and skirt and provides a flat shoulder for mating contact with the end of the branch line pipe. Openings through the diaphragm section provide access to said seal recess to facilitate placement of seal materials in the recess.

2 Claims, 4 Drawing Figures

PATENTED MAR 12 1974  3,796,445

INVENTOR.
FRED R. STROTT

BY
ATTORNEY

PIPE SADDLE

BACKGROUND OF THE INVENTION

The placement and interconnection of branch lines to main or trunk lines has for long periods of time presented a problem in connection with pipe laying activities due to the fact that the location of branch lines cannot always be accurately pre-established. With the advent of main line piping systems wherein the joints of a system are at greater distances apart, the problems are more pronounced. In accordance with present practice where sewer or supply lines may be installed by automatic trenching mechanisms or even by plow units, little or no attempt is presently being made to establish Y connections to facilitate the subsequent installation of branch lines. It is much simpler to cut into the main line and install the branch in its most efficient location. Various types of saddles have previously been used for tapping previous and present main line systems. The present invention presents a saddle component that is particularly well adapted for use to provide connections to main lines that may be of cement, tile or plastic construction and where the main lines may be of varying diameter. The saddle is made preferably of a plastic material that may be molded in distinctive shape to facilitate intended useage.

SUMMARY OF THE INVENTION

The present invention provides a saddle connector for use in making branch connections to pipe systems. It is particularly adapted for use when establishing inlets or outlets on supply or sewer piping systems. When used in a sewer line the saddle can be placed at any position along a main trunk line to facilitate convenient interconnection of household drains. The saddle, which is preferably of plastic material, has a plurality of raised or scored markings to indicate cut lines to adapt the saddle for secure fitting on main lines of varying diameter. When cut to a prescribed and delineated curvature, the saddle will fit accurately on the trunk line to be intercepted, and when a hole of proper size to accept the inner pipe stub has been drilled or cut, the saddle will fit securely in place. The recess provided between the inner pipe stub and an outer skirt is filled with a cementious grout, solvent bond material, a gasket or sealant. Thereafter the branch drain may be connected to the fitted receptacle provided by flange portions of the saddle to be secured therein. Access openings into the recess space may be provided at an inner shoulder of the saddle to facilitate placement of the seal material.

DESCRIPTION OF THE PREFERRED EMBODIMENTS

Figure 1:
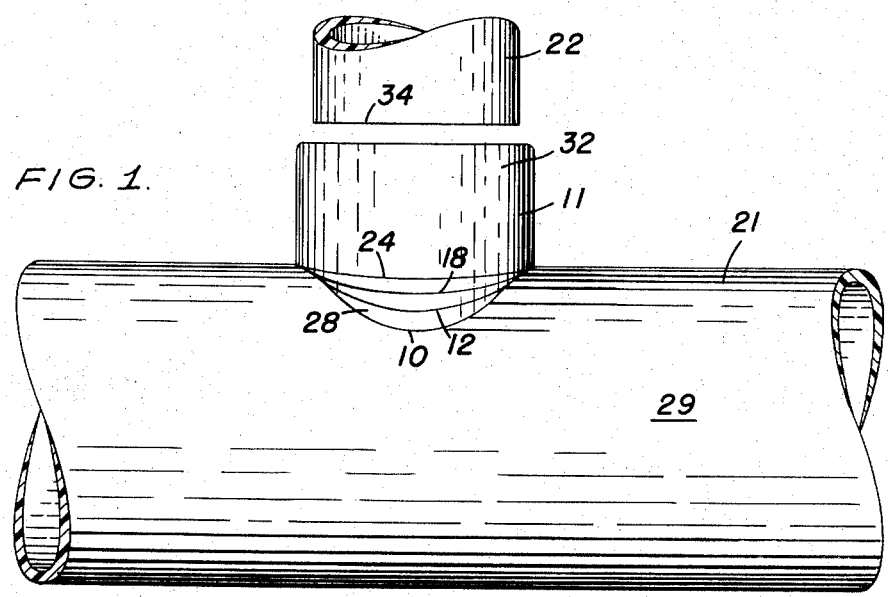
FIG. 1 is a side elevation showing an interconnection of branch and main lines.
Figure 2:
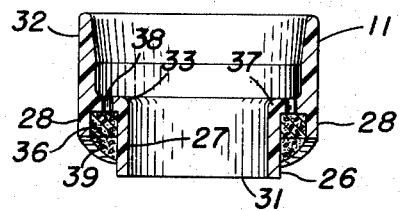
FIG. 2 is a cross-sectional side elevation through a saddle element.
Figure 3:
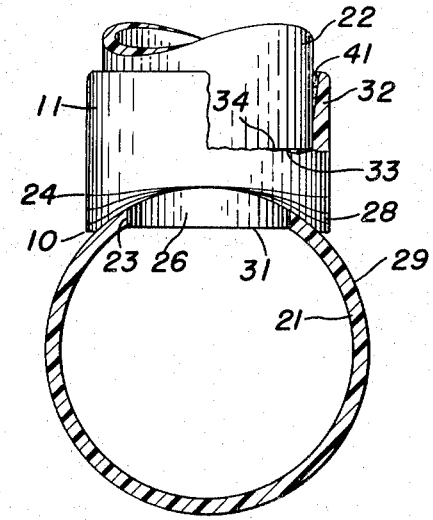
FIG. 3 is an end elevation in partial cross-section showing features of the assembly of FIG. 1.
Figure 4:
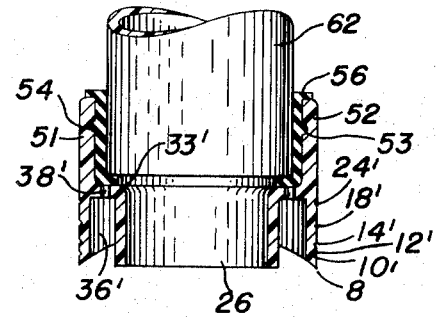
FIG. 4 is an end elevation in partial cross-section showing an untrimmed type of modified saddle using a grommet or gasket type lock for securing branch lines in place.

A first embodiment of the invention is shown in FIGS. 1-3. Here the saddle component 11 is shown applied to a main line 21 that is of approximately 10-inch diameter. The saddle is used to provide a connection for a branch line 22 that is in the present illustration of approximately 6-inch diameter. The main or trunk line may be of cement, tile or plastic type construction. When a branch line from a house is to be connected thereto, a hole 23 is drilled, cut or chipped into the top circumference of the main 21. The hole 23 is of a size to closely engage the inner pipe stub 26 of the saddle 11. The central opening 27 through the pipe stub 26 should be of a diameter corresponding to the inner diameter of the branch line 22 in order to avoid any flow restrictions. After the receiving hole 23 has been cut in the main 21 the outer or side skirts 28 of saddle 11 are trimmed along raised or scored transition contour markings provided on the exterior surface of such skirt. As shown in FIGS. 1 and 3, these markings are drawn to determine proper contour cuts that may be made in the skirt 28 so that the cut or modified skirt will thereafter closely engage the outer surface 29 of the main line to which the saddle is attached. For the illustrations provided in FIGS. 1 and 3 the skirt has been relieved to a score line identified by the numeral 10, since this is the relative size of the illustrated main line 21. Usually score lines will be provided so that the saddle can be adapted for use with the main lines of 8, 10, 12, 14, 18 and 24 inch flow diameter. FIG. 4 illustrates an uncut saddle of modified type 51 which is adapted for direct application to an 8-inch main line.

When the side skirts have been cut by sawing, rasping, grinding or similar process to the proper contour marking, the saddle can be installed, and the inner stub 26 will then extend into the main line 21 to a position wherein the lower extremity 31 of the stub 26 essentially defines a chord across the cut inner circumferential surface of the main line. Preferably no trimming of this inner stub 26 will be required to obtain an installation substantially as illustrated in which there will be but little interference with the full flow carrying capacity of the main line 21.

Further construction features for the saddle 11 are shown in FIGS. 2 and 3. This construction provides a pipe receiving flange 32 that is of inner diameter larger than the inner diameter for the pipe stub 26. A shoulder 33 is, accordingly, provided to engage and support a terminal end 34 of the branch line 22. The flange 32 continues past the diaphragm section 37 providing the shoulder 33 to form the depending skirts 28. These depending skirts 28 and the inner pipe stub 26 themselves then provide a recess 36 that is of cylindrical derivation limited at one axial extent by the diaphragm segment 37 and at the other axial extent by transition surfaces determined by the terminal end of contoured skirts 28. This recess 36 is provided to receive and hold a seal material 39 which will secure the saddle 11 to the main line 21. The particular seal used with different installations may be changed in keeping with the type of materials used for the main and branch lines and for construction of the saddle itself.

For modern practice the saddle 11 is preferably made of plastic or synthetic material with ABS (acrylonitrile butadiene styrene) materials being preferred. The saddle may be made of PVC (Poly vinyl chloride), polyethelene, POM (Polyacetal), NBR (Nitril Butadiene Rubber), Neoprene (Poly 2-Chlorobutadiene), or other similar materials that will be compatible with the type of liquid waste or supply being carried by the lines. The saddle likewise can be made of cementitious or tile materials. Where the saddles are made of plastic materials a poured or liquid type seal of epoxy or a seal that is of a solvent bond type for the particular materials being used is preferred. Where the saddle is being applied to tile or cement main lines, a cementitious seal may be provided either of regular Portland cement or of cement and epoxy mixtures and sand. Some seals may be applied by placing a substantial quantity thereof in the recess 36 when the saddle is in inverted position. If a surplus of sealant is thus applied, the saddle can be forcibly urged into place, and any excess seal material will be expelled. Where liquid type seals are used, a plurality of holes 38 may be provided through the diaphragm section 37 so that the sealant can be placed after the saddle is positioned. Where a plastic type of saddle 11 is provided for use together with a plastic type of branch line, as shown in FIG. 3, a solvent bond material 41 may be placed between the end of the branch line 22 and the tapered flange portion 32 to securely hold the branch line in its saddle adapter.

For a modified type of saddle 51, as shown in FIG. 4, the flange 52 has a circumferential groove 53 adapted to receive the bead 54 of a grommet gasket 56. For this type of installation the gasket 56 is applied to the end of the branch pipe 62, and thereafter the branch pipe and gasket are forced toward the diaphragm shoulder 33'. When in the fully applied position, the branch line will be held in the saddle 51 by the gasket element. As in the previous embodiments, a seal recess 36' and access openings 38' will be provided so that the saddle may be applied and secured to a main line structure.

For all embodiments of the invention secure installations may be made to join branch and main lines. The connection can be made at any point along the length of the main line; accordingly, the system is well suited for use where it is most convenient to complete a main line installation before branch line locations are established. The ABS or other plastic materials that are preferably used for the saddle construction can have a long service life, since the most desirable materials are essentially unaffected by chemical solutions that might be carried by the main lines or chemical inclusions in the soil cover for such lines. In instances where the saddle might be used for joining metal lines, the ABS or other plastic materials can provide protection from electrolytic corrosion influences.

A main feature of the embodiments which makes it possible for a single saddle configuration to be fitted to main lines of varying diameter is of prime importance in connection with inventory control economies. With this system it is unnecessary for contractors to keep or to carry to job sites a large variety of saddle components of different size. The present saddles may be cut along the contoured markings to readily adapt a standard saddle for use at the intended main line tap irrespective of the main line size.

I claim:

1. A pipe saddle for use when making branch line connections to a main line at random locations therealong comprising a body of generally cylindrical exterior configuration, a diaphragm segment having a flat upwardly disposed surface positioned therein dividing said body into an outwardly opening flange for reception of said branch lines and an inwardly opening skirt section for engagement against exterior surfaces of the main line, and a cylindrical pipe stub of length for extension through the walls of said main line and disposed within said skirt section intercepting said diaphragm segment to provide an interconnecting flow passage from said flange through said stub, said stub having an inner diameter less than the inner diameter of said flange thereby providing a shoulder at said diaphragm segment and said stub having an outer diameter of lesser size than the inner diameter of said flange whereby said skirt and stub are spaced apart providing an inwardly disposed recess for the reception of seal materials when the pipe stub is inserted through an opening in said main line, said diaphragm section further providing openings through a portion of the flat upwardly disposed surface of said diaphragm to facilitate introduction of seal materials, said openings communicating with said recess from positions that will be closed off when a branch line is installed.

2. The pipe saddle as set forth in claim 1 and further comprising contour markings on said skirt providing trim lines to which the skirt is cut for mating conformance with the exterior surface of main lines of varying size and thickness wherein the positioning of said contour markings and the length of said pipe stub is regulated in accordance with the contour of the exterior surface of said main lines and the wall thickness thereof whereby the downward end of said pipe stub extends through the cut opening in said main line to a location coinciding with a chord line across the inner circumference of said main line drawn from the lateral ends of the cut provided for said stub.

* * * * *